United States Patent
Kawamura et al.

(10) Patent No.: US 10,466,672 B2
(45) Date of Patent: Nov. 5, 2019

(54) OPERATION PLAN CREATION DEVICE, OPERATION PLAN CREATION METHOD, AND OPERATION PLAN CREATION PROGRAM

(71) Applicant: MITSUBISHI HEAVY INDUSTRIES, LTD., Tokyo (JP)

(72) Inventors: Naoya Kawamura, Tokyo (JP); Hiroyuki Isu, Tokyo (JP); Manabu Kasano, Tokyo (JP); Aki Nakayama, Tokyo (JP); Tsuyoshi Nakaji, Tokyo (JP); Koji Matsui, Tokyo (JP); Tomoaki Kitagawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 591 days.

(21) Appl. No.: 14/768,554

(22) PCT Filed: Feb. 10, 2014

(86) PCT No.: PCT/JP2014/053035
§ 371 (c)(1),
(2) Date: Aug. 18, 2015

(87) PCT Pub. No.: WO2014/136532
PCT Pub. Date: Sep. 12, 2014

(65) Prior Publication Data
US 2015/0378338 A1 Dec. 31, 2015

(30) Foreign Application Priority Data

Mar. 4, 2013 (JP) .................................. 2013-041778

(51) Int. Cl.
*G05B 19/042* (2006.01)
*G06Q 50/10* (2012.01)
*G06Q 10/04* (2012.01)

(52) U.S. Cl.
CPC ......... *G05B 19/0428* (2013.01); *G06Q 10/04* (2013.01); *G06Q 50/10* (2013.01); *G05B 2219/32107* (2013.01)

(58) Field of Classification Search
CPC ...... G05B 19/0428; G05B 2219/32107; G06Q 10/06; G06Q 10/063114; G06Q 10/04; G06Q 50/10; G01M 1/00
See application file for complete search history.

(56) References Cited

U.S. PATENT DOCUMENTS 6,928,391 B2   8/2005 Fujiyama et al.
7,143,007 B2 * 11/2006 Long .................. G05B 19/4065
                                                702/184

(Continued)

FOREIGN PATENT DOCUMENTS

CN          1335559       2/2002
CN        101185065       5/2008

(Continued)

OTHER PUBLICATIONS

Written Opinion of the International Searching Authority dated Apr. 1, 2014 in International (PCT) Application No. PCT/JP2014/053035, with English translation.

(Continued)

*Primary Examiner* — Matthew S Gart
*Assistant Examiner* — Stephen S Swartz
(74) *Attorney, Agent, or Firm* — Wenderoth, Lind & Ponack, L.L.P.

(57) ABSTRACT

An apparatus for updating an operation plan of a high-temperature component based on operation performance. The apparatus includes: a display unit which displays an operation plan of multiple high-temperature components which are mounted upon a device; a storage unit which stores, for each device, at least initial setting data including (Continued)

information regarding operation start times of the high-temperature components and scheduled times for carrying out periodic inspections of the high-temperature components; an operation plan creation unit which, using the initial setting data, generates data of the operation plan including operation intervals of the high-temperature components from the operation start times to the scheduled times for carrying out the periodic inspections, and stores same in the storage unit for each device; and an operation plan update unit which updates the operation plan data which is displayed on the display unit, based on the high-temperature component operation performance information.

4 Claims, 12 Drawing Sheets

(56) References Cited

U.S. PATENT DOCUMENTS

| | | | | |
|---|---|---|---|---|
| 2002/0016655 A1* | 2/2002 | Joao | G07C 5/008 | 701/33.4 |
| 2003/0187530 A1* | 10/2003 | Hotta | F01D 5/005 | 700/97 |
| 2003/0195860 A1 | 10/2003 | Ball | | |
| 2005/0031131 A1* | 2/2005 | Browning | H04R 3/08 | 381/59 |
| 2005/0267768 A1* | 12/2005 | Seader | G06Q 10/06 | 705/7.13 |
| 2009/0204234 A1* | 8/2009 | Sustaeta | G05B 13/024 | 700/29 |
| 2010/0249968 A1* | 9/2010 | Neuber | G06Q 10/06 | 700/99 |
| 2012/0176251 A1* | 7/2012 | Klass | E21B 44/00 | 340/854.6 |
| 2012/0290104 A1* | 11/2012 | Holt | G06Q 10/00 | 700/29 |
| 2012/0290497 A1 | 11/2012 | Magara et al. | | |
| 2013/0060487 A1* | 3/2013 | Papadimitriou | G10L 15/22 | 702/34 |
| 2014/0088887 A1* | 3/2014 | Poon | F03B 15/00 | 702/34 |
| 2015/0026107 A1* | 1/2015 | Vijayaraghavan | G06Q 10/06 | 706/12 |

FOREIGN PATENT DOCUMENTS

| | | | |
|---|---|---|---|
| CN | 102016888 | 4/2011 | |
| JP | 19925473 A * | 1/1992 | |
| JP | 2002-197147 | 7/2002 | |
| JP | 2003-58234 | 2/2003 | |
| JP | 2003-67038 | 3/2003 | |
| JP | 2003-167966 | 6/2003 | |
| JP | 2004-145496 | 5/2004 | |
| JP | 2005-240776 | 9/2005 | |
| JP | 2009-48316 | 3/2009 | |
| JP | 2014-106627 | 6/2014 | |
| WO | WO2005038613 A2 * | 4/2005 | G05B 19/0428 |

OTHER PUBLICATIONS

Decision to Grant a Patent dated Jan. 31, 2017 in corresponding Japanese Application No. 2013-041778, with English translation.
Office Action dated Aug. 11, 2017 in Chinese Application No. 201480012200.7, with English Translation.
International Search Report dated Apr. 1, 2014 in International (PCT) Application No. PCT/JP2014/053035, with English translation.

* cited by examiner

FIG.2

| SHEET NAME | ITEM | MANDA-TORY | INPUT FORMAT | INPUT EXAMPLE | EXPLANATION |
|---|---|---|---|---|---|
| config | NUMBER OF DEVICES | O | PULL DOWN | 4 | NUMBER OF UNITS OF DEVICES IN CORRESPONDING PLANT |
| | NUMBER OF PLAN YEARS | O | INPUT | 13 | NUMBER OF YEARS FOR WHICH PARTS ROTATION IS TO BE CALCULATED |
| | PLANT NAME | O | INPUT | PL1 | PLANT NAME |
| | MODEL | O | INPUT | 701F | MODEL |
| | DELIVERED COMPONENT | O | INPUT | COM | COMPONENTS FOR WHICH PARTS ROTATION IS CONSIDERED. ENTER HORIZONTALLY. |
| | COMBUSTION PATTERN | | INPUT | EXCLU-SIVELY GAS | ENTER COMBUSTION PATTERN. NO EFFECT ON ROTATION CALCULATION. |
| | OPERATION START YEAR | O | INPUT | 2010 | OPERATION START YEAR (ENTER THE STARTING YEAR WHEN PARTS ROTATION IS TO BE DRAWN FROM MIDWAY NOT FROM THE OPERATION START) |
| | OPERATION START MONTH | O | INPUT | 10 | OPERATION START MONTH (ENTER THE STARTING MONTH WHEN PARTS ROTATION IS TO BE DRAWN FROM MIDWAY NOT FROM THE OPERATION START) |
| | PERIODIC INSPECTION INTERVAL | O | INPUT | 18000 | INTERVAL BETWEEN PERIODIC INSPECTIONS. EOH. FOR EACH DEVICE. TOGETHER WITH THE START MONTH/ YEAR WHEN REVISING. |
| | COMPONENT LIFESPAN | O | INPUT | 36000 | COMPONENT LIFESPAN. EOH. FOR EACH DEVICE. TOGETHER WITH THE START MONTH/YEAR WHEN REVISING. |
| | REPLACEMENT PATTERN | O | INPUT | 1 | SET NUMBER OF INTERVALS IN WHICH REPLACEMENT IS PERFORMED. 1=REPLACEMENT IN ONE INTERVAL, 2=REPLACEMENT IN TWO INTERVALS |
| Parts_Master | DELIVERED COMPONENT NAME | O | INPUT | COM | COMPONENTS FOR WHICH PARTS ROTATION IS CONSIDERED. |
| | DELIVERED COMPONENT ID | O | INPUT | COM | SAME AS ABOVE. (REQUIRED FOR CALCULATION) |
| | CONSTITUENT COMPONENT | O | INPUT | STD | IN THE CASE IN WHICH ONE COMPONENT IS CONFIGURED OF A PLURALITY OF COMPONENTS, ENTER ONLY THE NUMBER THEREOF. |
| | NUMBER OF CONSTITUENT COMPONENTS | O | INPUT | 2 | CONSTITUENT COMPONENT QUANTITY |

FIG.3
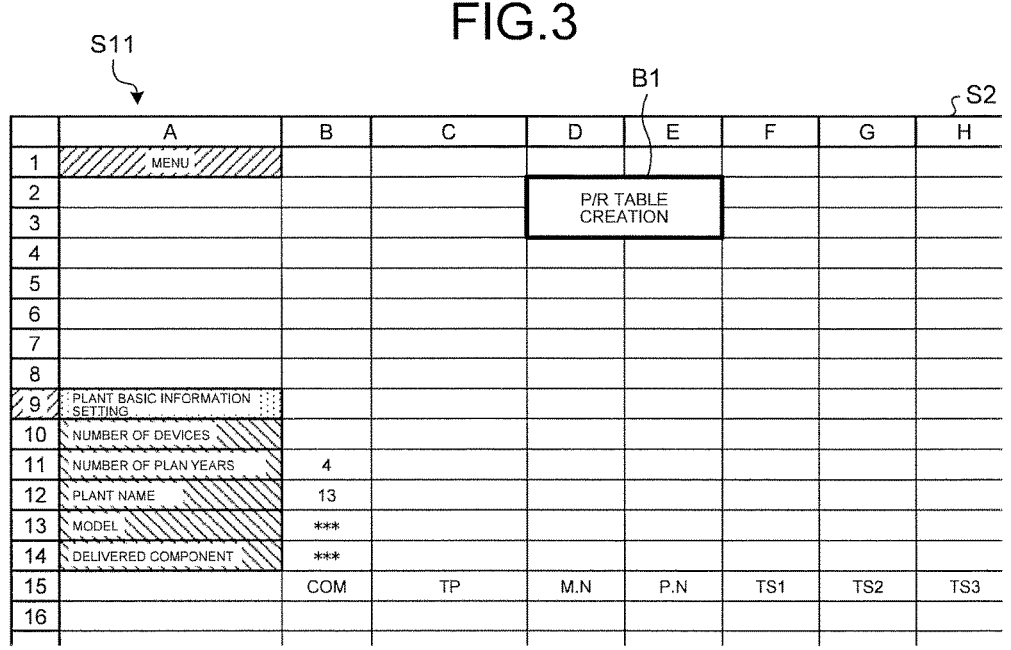
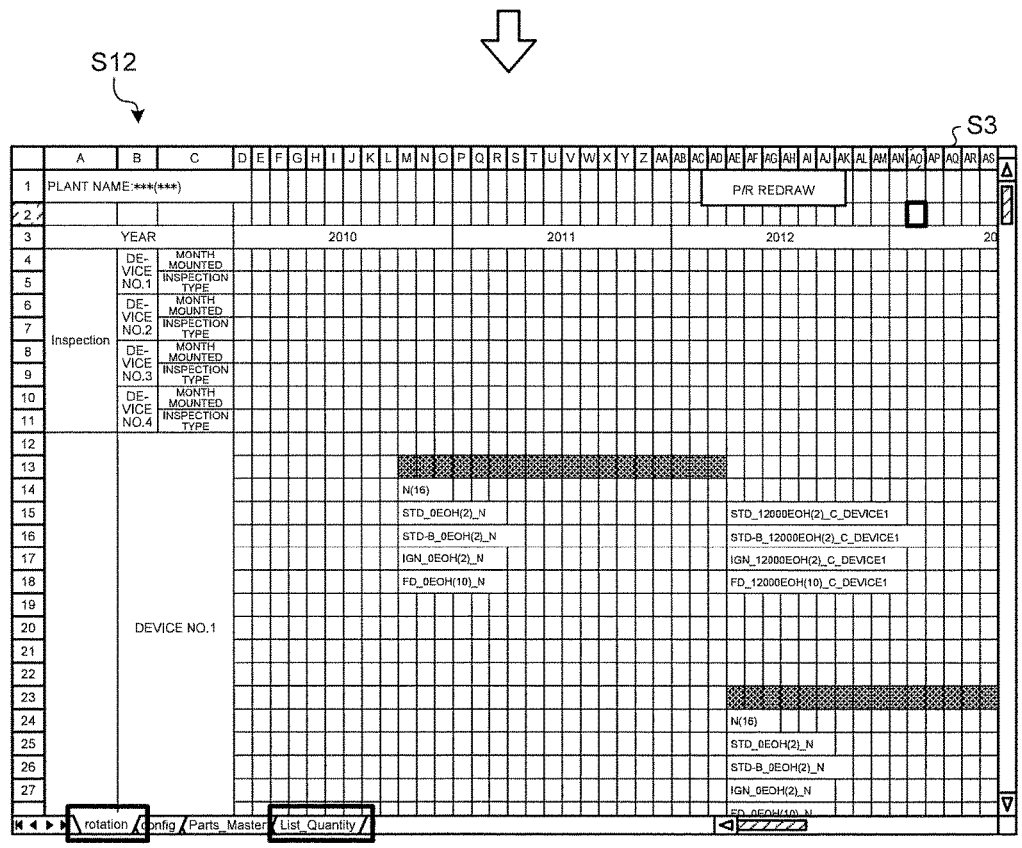

OPERATION PLAN CREATION DEVICE, OPERATION PLAN CREATION METHOD, AND OPERATION PLAN CREATION PROGRAM

TECHNICAL FIELD

The present invention relates to an operation plan creation device, an operation plan creation method, and an operation plan creation program.

BACKGROUND ART

It is feasible for products used under extreme environments such as high-temperature and high-pressure environments to deteriorate with respect to temperature and pressure, and therefore periodic inspections are carried out. These products are produced using expensive materials such as heat-resistant alloys that are able to withstand extreme environments, leading the products to being used in cycles of use and repair until it is determined that the products have reached their lifespan.

Furthermore, high-temperature components are employed in rotation so to speak, in which the high-temperature components are replaced with spare components or are replaced with repaired components. Rotation is not carried out only with pre-prepared spare components in the same device but also with pre-prepared spare components in a different device or with repaired components of the same or different device. For example, in the case in which a high-temperature component a1 of a device A is subjected to a periodic inspection, rotation is carried out in which the high-temperature component a1 is replaced with a pre-prepared spare component in the device A, or is replaced with a repaired component b1 that has been repaired at a prior periodic inspection of another device B, or the like. With this kind of rotation operation, a high-temperature component is efficiently used until reaching the lifespan thereof, reducing the cost and the like borne by the user.

CITATION LIST

Patent Literature

Patent Document 1: Japanese Unexamined Patent Application Publication No. 2005-240776A

SUMMARY OF INVENTION

Technical Problem

An operation plan for managing a rotation operation (parts rotation) for high-temperature components is created with an object of efficiently carrying out the rotation operation for the high-temperature components. The operation plan that is assumed to be the most efficient when the operation is started is created; however, there are many areas that are carried out manually. There are also cases in which a high-temperature component is used differently from the plan made when the operation was started, making it necessary to review the operation plan in accordance with the operation performance (actual use situation) of the high-temperature component; however, there is a problem in that the work to review the operation plan is a considerable burden.

An object of the present invention is to provide an operation plan creation device, an operation plan creation method, and an operation plan creation program with which information regarding an operation plan for high-temperature components can be easily updated on the basis of operation performance.

Solution To Problem

An operation plan creation device which, as one aspect, includes: a display unit configured to display a screen that shows an operation plan for multiple high-temperature components mounted in devices; a storage unit configured to store, for each of the devices, at least initial setting data which includes information regarding operation start times of the high-temperature components and scheduled times for carrying out periodic inspections of the high-temperature components; an operation plan creation unit configured to, using the initial setting data, generate data of the operation plan including operation periods of the high-temperature components from the operation start times to the scheduled times for carrying out the periodic inspections, and store the data for each of the devices in the storage unit; and an operation plan update unit configured to update the data of the operation plan displayed on the display unit, on the basis of information regarding operation performance of the high-temperature components.

An operation plan creation method which, as one aspect, is executed by an operation plan creation device having a display unit, the method including the steps of: reading initial setting data from a storage unit which stores, for each device in which multiple high-temperature components are mounted, at least the initial setting data which includes information regarding operation start times of the high-temperature components and scheduled times for carrying out periodic inspections of the high-temperature components, using the read initial setting data to generate data of the operation plan including operation periods of the high-temperature components from the operation start times to the scheduled times for carrying out the periodic inspections, and storing the data for each of the devices in the storage unit; displaying the operation plan on the display unit; and updating the data of the operation plan displayed on the display unit, on the basis of information regarding operation performance of the high-temperature components.

An operation plan creation program which, as one aspect, causes an operation plan creation device having a display unit to execute the steps of: reading initial setting data from a storage unit which stores, for each device in which multiple high-temperature components are mounted, at least the initial setting data which includes information regarding operation start times of the high-temperature components and scheduled times for carrying out periodic inspections of the high-temperature components, using the read initial setting data to generate data of the operation plan including operation periods of the high-temperature components from the operation start times to the scheduled times for carrying out the periodic inspections, and storing the data for each of the devices in the storage unit; displaying the operation plan on the display unit; and updating the data of the operation plan displayed on the display unit, on the basis of information regarding operation performance of the high-temperature components.

Advantageous Effects of Invention

The operation plan creation device, the operation plan creation method, and the operation plan creation program according to the present invention achieve the effect of it being possible to easily update information regarding an operation plan for high-temperature components on the basis of operation performance.

BRIEF DESCRIPTION OF DRAWINGS

FIG. 2 is a drawing for explaining the configuration of initial setting data.

FIG. 3 is a drawing for explaining control executed by an operation plan creation unit.

FIG. 7 is a drawing illustrating the configuration of data displayed on a sheet depicting quantities of high-temperature components.

FIG. 8 is a drawing for explaining control executed by an operation plan update unit.

FIG. 9 is a drawing for explaining control executed by the operation plan update unit.

FIG. 11 is a drawing illustrating an example of the input of settings for treatment for high-temperature components removed for a periodic inspection.

FIG. 13 is a drawing illustrating an example of the input of settings for treatment for high-temperature components removed for a periodic inspection.

DESCRIPTION OF EMBODIMENTS

Hereinafter, embodiments of the operation plan creation device, the operation plan creation method, and the operation plan creation program according to the present invention are described in detail on the basis of the drawings. Note that the present invention is not limited by these embodiments. In addition, the constituent elements in these embodiments include elements that are able to be easily conceived by a person skilled in the art, elements that are substantially the same, and elements of an equivalent scope so to speak. In particular, in the following embodiments, a description is given regarding an example of a method in which data for an operation plan for high-temperature components mounted in devices that are operated in a prescribed facility (plant) such as a mechanical or electrical facility is created and the created operation plan is updated with actual operation performance being reflected.

Embodiments

[Configuration of Operation Plan Creation Device]

Figure 1:
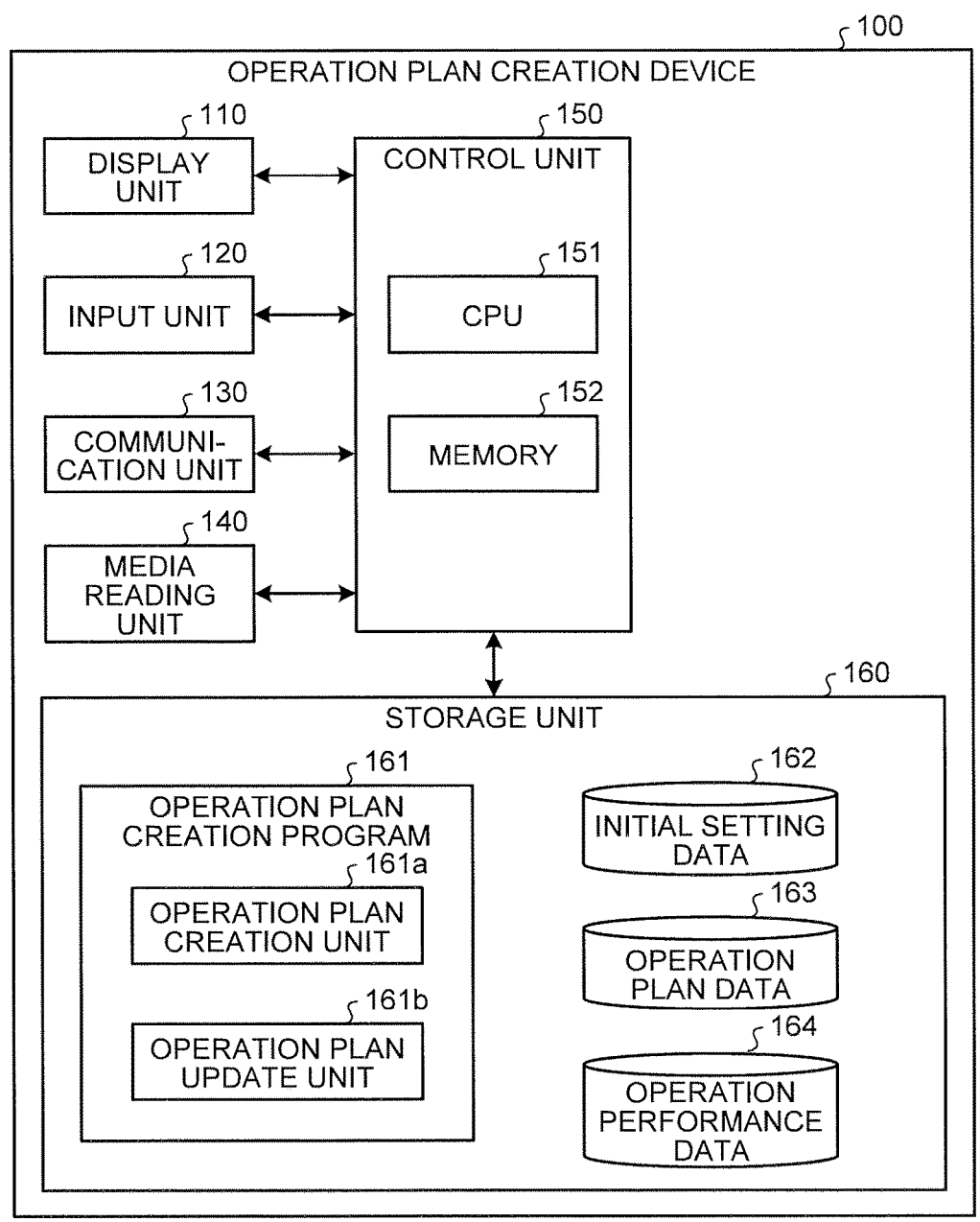
FIG. 1 is a block diagram illustrating an example of the functional configuration of an operation plan creation device according to the present embodiment.

FIG. 1 is a block diagram illustrating an example of the functional configuration of an operation plan creation device according to the present embodiment. An operation plan creation device 100 is provided with a display unit 110, an input unit 120, a communication unit 130, a media reading unit 140, a control unit 150, and a storage unit 160.

The display unit 110 has a display device such as a liquid crystal panel or an organic electro-luminescence (organic EL) panel, and displays a variety of information such as characters, symbols, and figures on the basis of a control signal transmitted from the control unit 150. The input unit 120 has an input device such as a keyboard and outputs to the control unit 150 a signal corresponding to an operation carried out by the user with the input device. The communication unit 130 controls the reception and transmission of information with other devices on the basis of a prescribed communication protocol. The media reading unit 140 reads a program and data from a portable non-transitory storage medium such as an optical disc, a magneto-optical disc, or a memory card.

The control unit 150 is provided with a central processing unit (CPU) 151, which is a computation device, and a memory 152, which is a storage device, and realizes a variety of functions by using these hardware resources to execute a program. Specifically, the control unit 150 reads a program stored in the storage unit 160 and deploys the program in the memory 152, and causes the CPU 151 to execute instructions included in the program deployed in the memory 152. The control unit 150 then reads and writes data with respect to the memory 152 and the storage unit 160 and controls the operation of the communication unit 130 and the like in accordance with execution results of the instructions executed by the CPU 151.

The storage unit 160 is provided with a nonvolatile storage device such as a magnetic storage device or a semiconductor storage device, and stores a variety of programs and data. The programs stored in the storage unit 160 include an operation plan creation program 161. The data stored in the storage unit 160 include initial setting data 162, operation plan data 163, and operation performance data 164.

All or some of the programs and data stored in the storage unit 160 in FIG. 1 may be stored in a storage medium able to be read by the media reading unit 140. Alternatively, all or some of the programs and data stored in the storage unit 160 in FIG. 1 may be acquired from another device by communication performed by the communication unit 130. For example, in the present embodiment, a storage medium having data regarding the actual operation performance of a device (such as the cumulative operation hours of the device) written thereon may be read by the media reading unit 140. Alternatively, data regarding the actual operation performance of a device (such as the cumulative operation hours of the device) may be acquired by communication performed by the communication unit 130 from an information processing device that manages the aforementioned data. The cumulative operation hours of the device acquired by the media reading unit 140 or the communication unit 130 is stored in the storage unit 160 as the operation performance data 164.

The initial setting data 162 is set by the user in order to create an operation plan for high-temperature components mounted in devices. FIG. 2 is a drawing for explaining the configuration of the initial setting data. FIG. 2 illustrates a setting sheet S1 that is displayed on the display unit 110 as a user interface in order for the initial setting data 162 to be set. As illustrated in FIG. 2, according to the setting sheet S1, the initial setting data 162 includes the number of devices, number of plan years, plant name, model, delivered component, combustion pattern, operation start year, operation start month, periodic inspection interval, component lifespan, replacement pattern, delivered component name, delivered component ID, constituent component, and number of constituent components.

The number of devices is the number of device units (four, for example) operated in a certain plant. The number of plan years is the number of years (13, for example) for which parts rotation for high-temperature components mounted in corresponding devices, namely, the creation of an operation plan, is to be carried out. A plant name is the name (PL1, for example) of the plant in which the corresponding devices are operated. A model is the model (701F, for example) of the corresponding devices. A delivered component is a component (COM, for example) for which parts rotation is considered. A combustion pattern is the pattern (exclusively gas, for example) of combustion in the corresponding devices. An operation start year is the year (2010, for example) in which operation of the corresponding devices is started. An operation start month is the month (October, for example) in which operation of the corresponding devices is started. A periodic inspection interval is hours (18,000, for example) representing the interval between periodic inspections of high-temperature components mounted in the corresponding devices. A component lifespan is the cumulative operation hours (36,000, for example) at which it is necessary for the high-temperature components mounted in the corresponding devices to be disposed. A replacement pattern is the number of intervals (one, for example) during which the high-temperature components mounted in the corresponding devices are to be replaced. A delivered component name and a delivered component ID are the same as the aforementioned delivered component. A constituent component is the name (STD, for example) of a component configured of a plurality of elements. The number of constituent components is the quantity (two, for example) of a constituent component.

The operation plan data 163 is created by an operation plan creation unit 161a, which is described hereinafter, using the initial setting data 162. The operation plan data 163 corresponds to data regarding an operation plan for the high-temperature components for when the operation of a certain plant is started.

The operation performance data 164 is the actual operation performance of devices that operate in a certain plant, and is data that includes the cumulative operation hours and the like of the devices, for example. The operation performance data 164 is acquired by the media reading unit 140 or the communication unit 130 and stored in the storage unit 160, for example.

The operation plan creation program 161 provides a function to create data for the operation plan for the high-temperature components mounted in the devices, and a function to update the created operation plan in accordance with the actual operation performance. The operation plan creation program 161 provides a function for receiving an operation from the user in order to execute processing relating to the creation of an operation plan. For example, an interface for receiving an operation from the user is configured by the operation plan creation program 161 and output to the display unit 110. This interface includes a worksheet (see S1 of FIG. 2) for receiving settings for the initial setting data 162, a worksheet for creating and updating data regarding an operation plan for the high-temperature components, a worksheet for carrying out operation performance of the high-temperature components, a sheet for selecting a plant for which an operation plan is to be displayed, and the like. In addition, the operation plan creation program 161 includes the operation plan creation unit 161a and an operation plan update unit 161b as illustrated in FIG. 1.

The operation plan creation unit 161a uses the initial setting data 162 stored in the storage unit 160 to create data regarding an operation plan for the high-temperature components for when the operation of a certain plant is started. The data regarding the operation plan created by the operation plan creation unit 161a includes data regarding an operation period of the high-temperature components and data regarding the configuration of the high-temperature components. FIG. 3 is a drawing for explaining control executed by the operation plan creation unit. An operation plan creation start sheet S2 illustrated in FIG. 3 is a sheet that is displayed when the creation of an operation plan is started by the operation plan creation unit 161a after the setting of the initial setting data 162 has been completed. A parts rotation sheet S3 illustrated in FIG. 3 is a sheet illustrating an operation plan for the high-temperature components automatically created by the operation plan creation unit 161a.

As illustrated in FIG. 3, after the setting of the initial setting data 162 has been completed, when an operation with respect to a button B1 (the section where "P/R table creation" is written) provided on the operation plan creation start sheet S2 is detected (step S11), the operation plan creation unit 161a uses the initial setting data 162 to create the parts rotation sheet S3 (rotation), and displays the parts rotation sheet S3 on the display unit 110 (step S12). An example in which the parts rotation sheet S3 is displayed is illustrated in the step S12 of FIG. 3; however, the operation plan creation unit 161a may also create a sheet (List_Quantity) indicating the quantity of high-temperature components.

Figure 4:
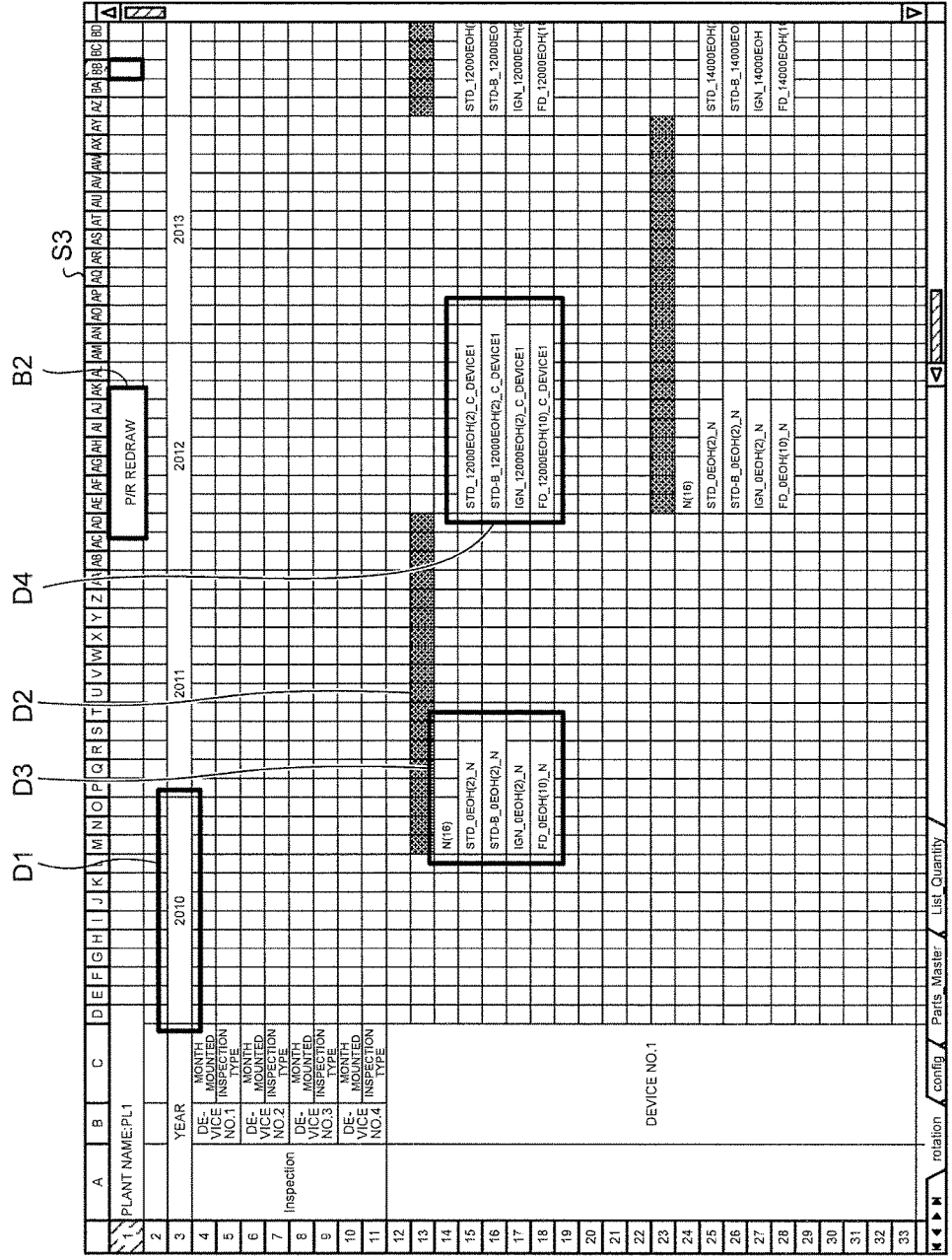
FIG. 4 is an enlarged drawing for explaining the configuration of data displayed on a parts rotation sheet.

FIG. 4 is an enlarged view for explaining the configuration of data displayed in the parts rotation sheet. As illustrated in FIG. 4, data corresponding to a plant name (PL1) and year information D1, which corresponds to the operation start year, is displayed in the parts rotation sheet S3. Data corresponding to an image D2 corresponding to an operation period of high-temperature components, configuration information D3 of high-temperature components mounted in the devices, and configuration information D4 of high-temperature components removed for a periodic inspection is displayed in the parts rotation sheet S3 for each of the devices (device No. 1 to device No. 4) operated in the corresponding plant. A button B2 is provided on the parts rotation sheet S3. The button B2 is a button for starting processing in the operation plan update unit 161b described hereinafter. In the example in FIG. 4, an operation plan is illustrated in which two sets of units configured of multiple high-temperature components are alternately mounted in device No. 1, for example. In the case in which the unit mounted in device No. 1 is removed for a periodic inspection when the operation is started, another unit is mounted in device No. 1 and operated, for example. Then, when it is time for the next periodic inspection, the unit mounted in device No. 1 is removed, and the unit that was removed for the previous periodic inspection is once again mounted in device No. 1 and operated. The operation plan creation unit 161a uses the initial setting data 162 to draw, on the parts rotation sheet S3, each of the plant name, the year information D1 corresponding to the operation start year, the image D2 corresponding to an operation period of the high-temperature components, the configuration information D3 of the high-temperature components mounted in the devices, and the configuration information D4 of the high-temperature components removed for a periodic inspection. With regard to the image D2 corresponding to an operation period of the high-temperature components, the operation plan creation unit 161a calculates the operation period for the high-temperature components from the operation start year and operation start month included in the initial setting data 162 to removal due to a periodic inspection, and draws the operation period image D2 on the parts rotation sheet S3 in such a way as to be consistent with the calculated operation period, for example. Note that the operation plan creation unit 161a is able to acquire in advance the scheduled frequency for carrying out periodic inspections (such as once per year or once per two years), the daily operation hours of the devices (such as 24 hours or 20 hours), and the like when calculating an operation period.

Figure 5:
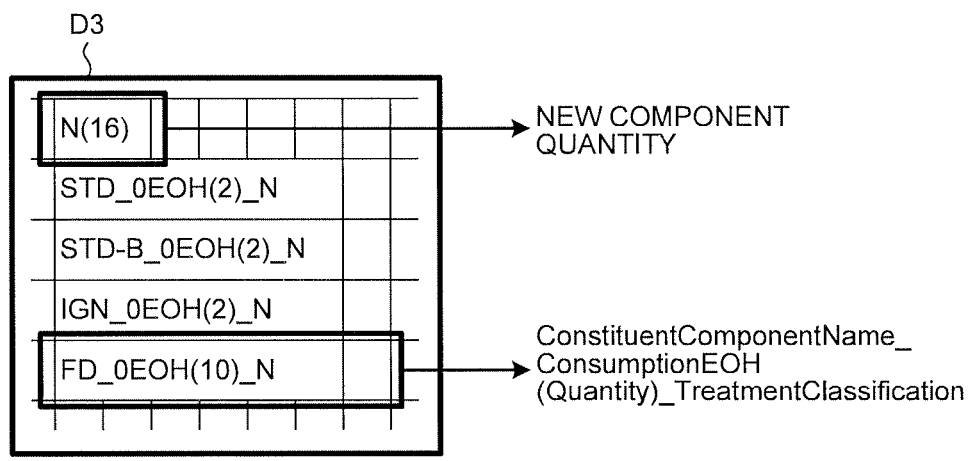
FIG. 5 is a drawing for explaining data depicting the configuration of high-temperature components displayed on the parts rotation sheet.

FIG. 5 is a drawing for explaining data indicating the configuration of high-temperature components displayed in the parts rotation sheet. As illustrated in FIG. 5, the "N(16)" portion of the data D3 regarding the configuration of high-temperature components indicates the quantity of new high-temperature components. A breakdown thereof is, as indicated in FIG. 5, that there are two STDs, two STD-Bs, two IGNs, and ten FDs. Furthermore, the portion of the data D3 regarding the configuration of high-temperature components besides the quantity of new high-temperature components indicates the configuration of the high-temperature components mounted in a device. For example, "FD_0EOH(10)_N" indicates data for "ConstituentComponentName_ConsumptionEOH(Quantity)_TreatmentClassific ation". Note that consumption EOH (equivalent operating hours) corresponds to the equivalent operating hours consumed and is calculated by the operation plan creation unit 161a with hour weighting being carried out with respect to phenomena that affect the lifespans of the high-temperature components. The example in FIG. 5 illustrates the start of the operation, and therefore the consumption EOH is "0". The treatment classification corresponds to the state of a high-temperature component or the treatment method for a high-temperature component, and includes N (new), R (repair), C (continue use), S (lifespan reached: dispose, or repair not possible: dispose), O (other), and the like. In the example illustrated in FIG. 5, the high-temperature components are all new, and therefore the treatment classifications are N (new).

Figure 6:
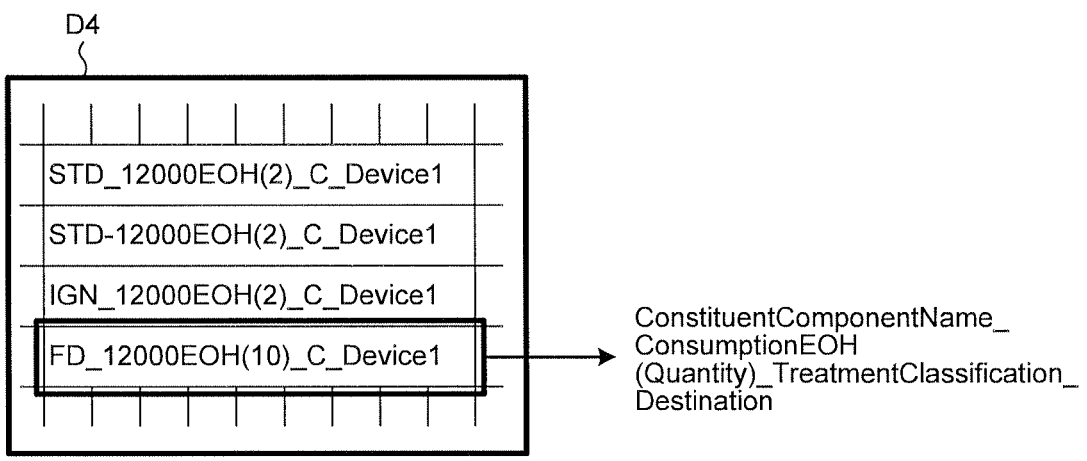
FIG. 6 is a drawing for explaining data regarding high-temperature components removed for a periodic inspection displayed on the parts rotation sheet.

FIG. 6 is a drawing for explaining data regarding high-temperature components removed for a periodic inspection, displayed on the parts rotation sheet. As illustrated in FIG. 6, the data D4 regarding high-temperature components removed for a periodic inspection indicates the configuration of high-temperature components removed from a device. For example, "FD_12000EOH(10)_C_Device1" indicates data for "ConstituentComponentName_ConsumptionEOH (Quantity)_TreatmentClassific ation_Destination". In the example illustrated in FIG. 6, the consumption EOH is "12,000" corresponding to the image data D2 for an operation period calculated by the operation plan creation unit 161a. The consumption EOH (equivalence operating hours) corresponds to the operation period (interval hours between inspections). The calculation of the consumption EOH is carried out using the initial setting data 162 (FIG. 2). When the intervals (EOH) for each device number are set in the setting sheet S1 (see FIG. 2), those interval portions are treated as operation portions and are added to the configuration information D4 (FIG. 4) displayed next to the image D2 (see FIG. 4) representing the operation period. Note that the length of the line for the image D2 corresponds to that drawn by converting the intervals into months with 8000 EOH as one year. The destination corresponds to a device (device No. 1, for example) that is mounted once again after having been removed for a periodic inspection and after the inspection has been completed. Note that there are cases in which data for remarks is added after the destination as information regarding the configuration of the high-temperature components. Information regarding whether a new high-temperature component has been arranged or information regarding whether the repair of a high-temperature component has been arranged is added in the remarks.

Figure 7:
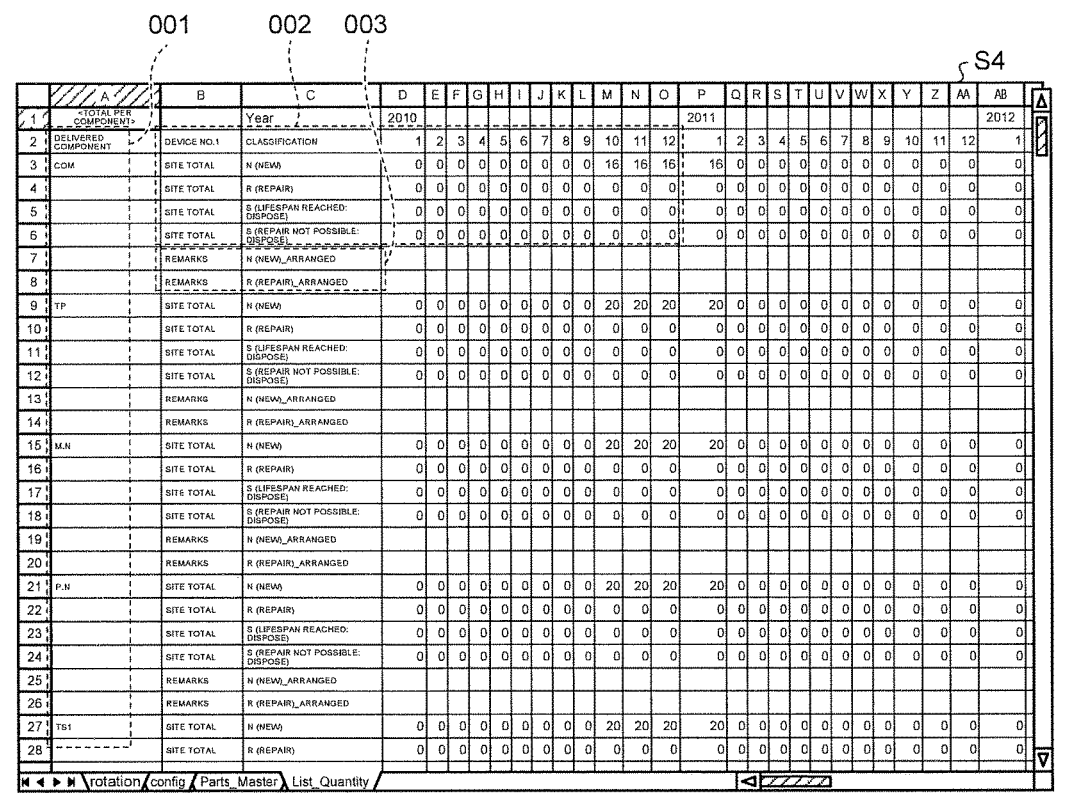

FIG. 7 is a drawing illustrating the configuration of data displayed on a sheet indicating quantities of high-temperature components. As illustrated in FIG. 7, data regarding components mounted in devices is aggregated with regard to the devices operated in a plant and is displayed on a quantity sheet S4 indicating the quantities of high-temperature components. For example, the quantity sheet S4 displays data obtained by aggregating totals of each of the components mounted in the devices (001, for example), data obtained by aggregating totals of each of the components corresponding to treatment classifications for each of the devices (002, for example), remarks data (003, for example) and the like. With the quantity sheet S4 illustrated in FIG. 7, the user is able to easily grasp information regarding each of the components mounted in the devices.

On the basis of the actual operation performance of the devices, the operation plan update unit 161b updates data regarding the operation plan for the high-temperature components made when the operation was started, created by the operation plan creation unit 161a. The data regarding the operation plan updated by the operation plan update unit 161b includes data regarding an operation period of high-temperature components and data regarding the configuration of the high-temperature components. For example, on the basis of information (such as the month in which an inspection is to be carried out) regarding periodic inspections carried out with respect to the high-temperature components, the operation plan update unit 161b redraws the image D2 corresponding to an operation period of the high-temperature components displayed on the parts rotation sheet S3, and also updates the configuration information (such as consumption EOH) of the high-temperature components removed for a periodic inspection. In addition, the operation plan update unit 161b updates the configuration information of the high-temperature components with the actual operation performance (such as cumulative operation hours) of the high-temperature components being reflected in the configuration information (such as consumption EOH) of the high-temperature components removed for a periodic inspection. The operation plan update unit 161b uses the cumulative operation hours and the like of the devices included in the operation performance data 164 as the actual operation performance of the high-temperature components.

Figure 8:
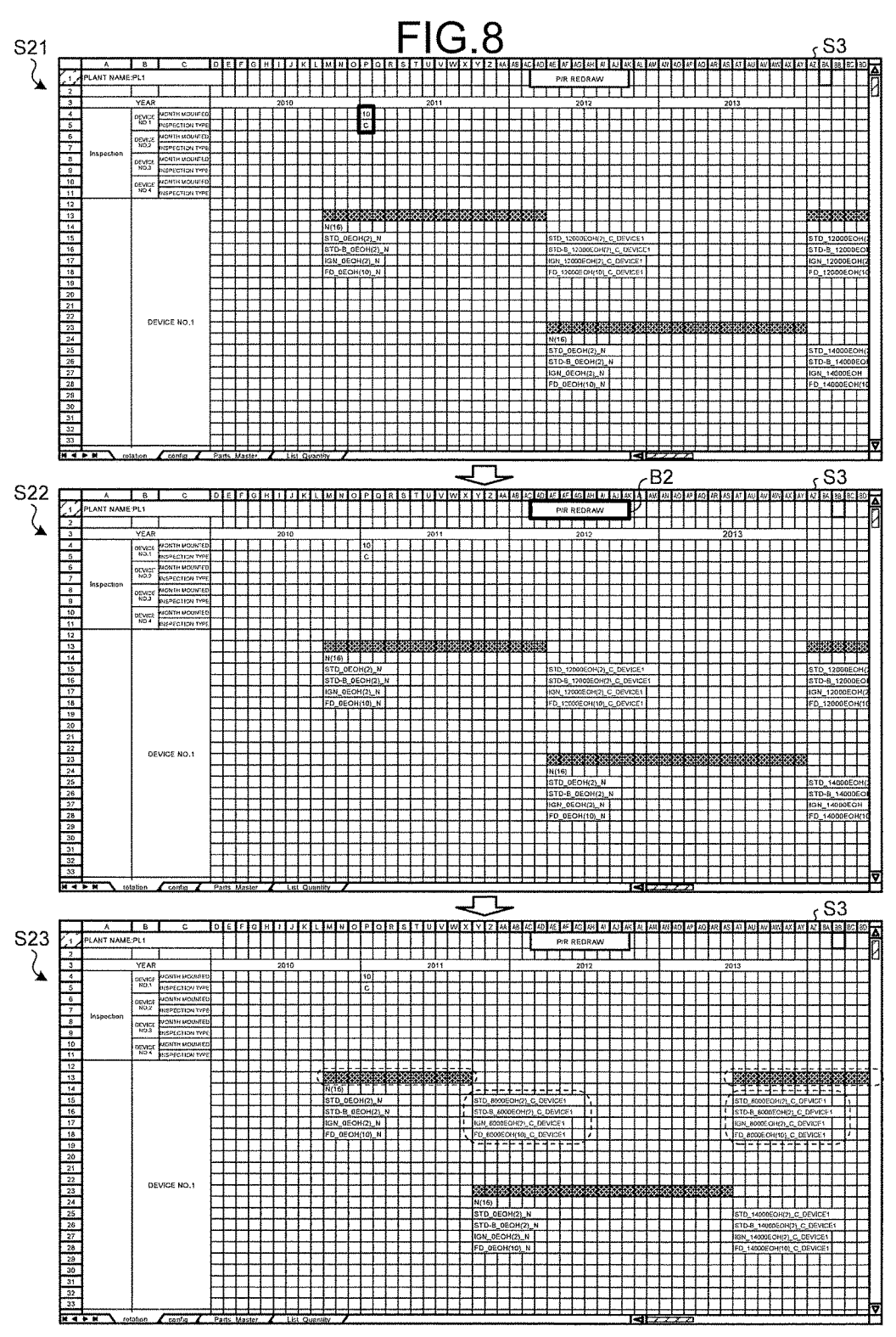
Figure 9:
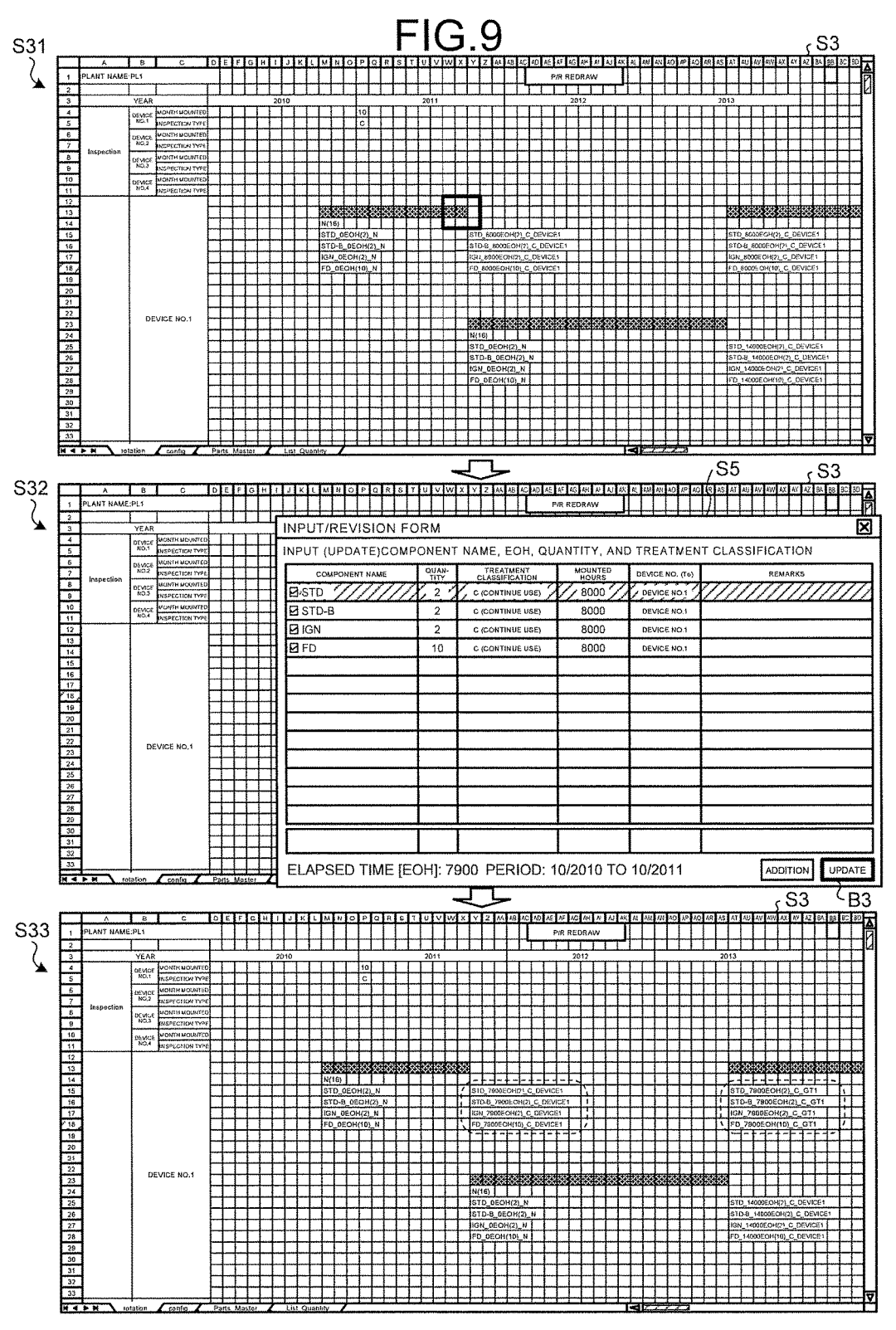

FIGS. 8 and 9 are drawings for explaining control executed by the operation plan update unit. Regarding the control in FIGS. 8 and 9, for example, the control unit 150 reads an operation plan for a plant selected by the user, from among the operation plan data 163 stored in the storage unit 160, and causes the parts rotation sheet S3 for the high-temperature components operated at the plant selected by the user to be started after being displayed on the display unit 110.

The redrawing of an operation period of the high-temperature components and the updating of the configuration information of the high-temperature components displayed in the parts rotation sheet S3 will be described using FIG. 8. As illustrated in FIG. 8, the operation plan update unit 161b receives the input of data "10" corresponding to October, which is the month in which a periodic inspection is carried out, and data "C" corresponding to an inspection pattern, in the region of operation year "2011" for device No. 1, in the parts rotation sheet S3 displayed on the display unit 110 (step S21). In step S21, the operation plan update unit 161b determines that a periodic inspection has been carried out in October of 2011. Note that the operation plan update unit 161b is able to specify the high-temperature components to undergo a periodic inspection, on the basis of the elapsed time from the operation start of device No. 1, for example. After the month in which the periodic inspection is carried out and the inspection pattern have been input, next, when an operation with respect to the button B2 provided on the parts rotation sheet S3 is detected (step S22), the operation plan update unit 161b recalculates an operation period of the high-temperature components removed for a periodic inspection, on the basis of the data "10" corresponding to the month in which a periodic inspection is carried out. As indicated by the dashed-line enclosure in FIG. 8, the operation plan update unit 161b redraws, on the parts rotation sheet S3, an image corresponding to the operation periods of all of the high-temperature components drawn on the parts rotation sheet S3, and also updates the configuration information (such as consumption EOH) of the high-temperature components removed for a periodic inspection (step S23). In the example illustrated in FIG. 8, the operation plan update unit 161b calculates the consumption EOH from the operation start to the time (October 2011) at which inspection is started, converts the calculated consumption EOH into months, and redraws the image corresponding to the operation periods. In the example illustrated in FIG. 8, the month in which an inspection is carried out is one year after the operation start, which is ahead of schedule from one year and a half after the operation start, and therefore the image corresponding to the operation period that is redrawn becomes shorter than the images illustrated in FIGS. 3 and 4, and the consumption EOH is also updated from 12,000 EOH to 8000 EOH.

Updating based on operation performance of the configuration information of the high-temperature components displayed in the parts rotation sheet S3 will be described using FIG. 9. As illustrated in FIG. 9, when an operation with respect to an end section of the operation period of the high-temperature components drawn on the parts rotation sheet S3 is detected (step S31), the operation plan update unit 161b displays an input/revision form sheet S5 on the display unit 110 (step S32). When an operation with respect to the button B3 is detected after the input of cumulative operation hours (7900, for example) has been received as the operation performance in the input/revision form sheet S5, the operation plan update unit 161b updates the configuration information (consumption EOH) of the high-temperature components operated in step S31 to information reflecting the cumulative operation hours and displays the information on the parts rotation sheet S3 (step S33). A configuration may be implemented in such a way that it is possible for the cumulative operation hours to be read directly from the operation performance data 164 stored in the storage unit 160 into the input/revision form and displayed, and a configuration may be implemented in such a way that the cumulative operation hours are displayed on the display unit 110 and input by the user.

[Processing by Operation Plan Creation Device]

Figure 10:
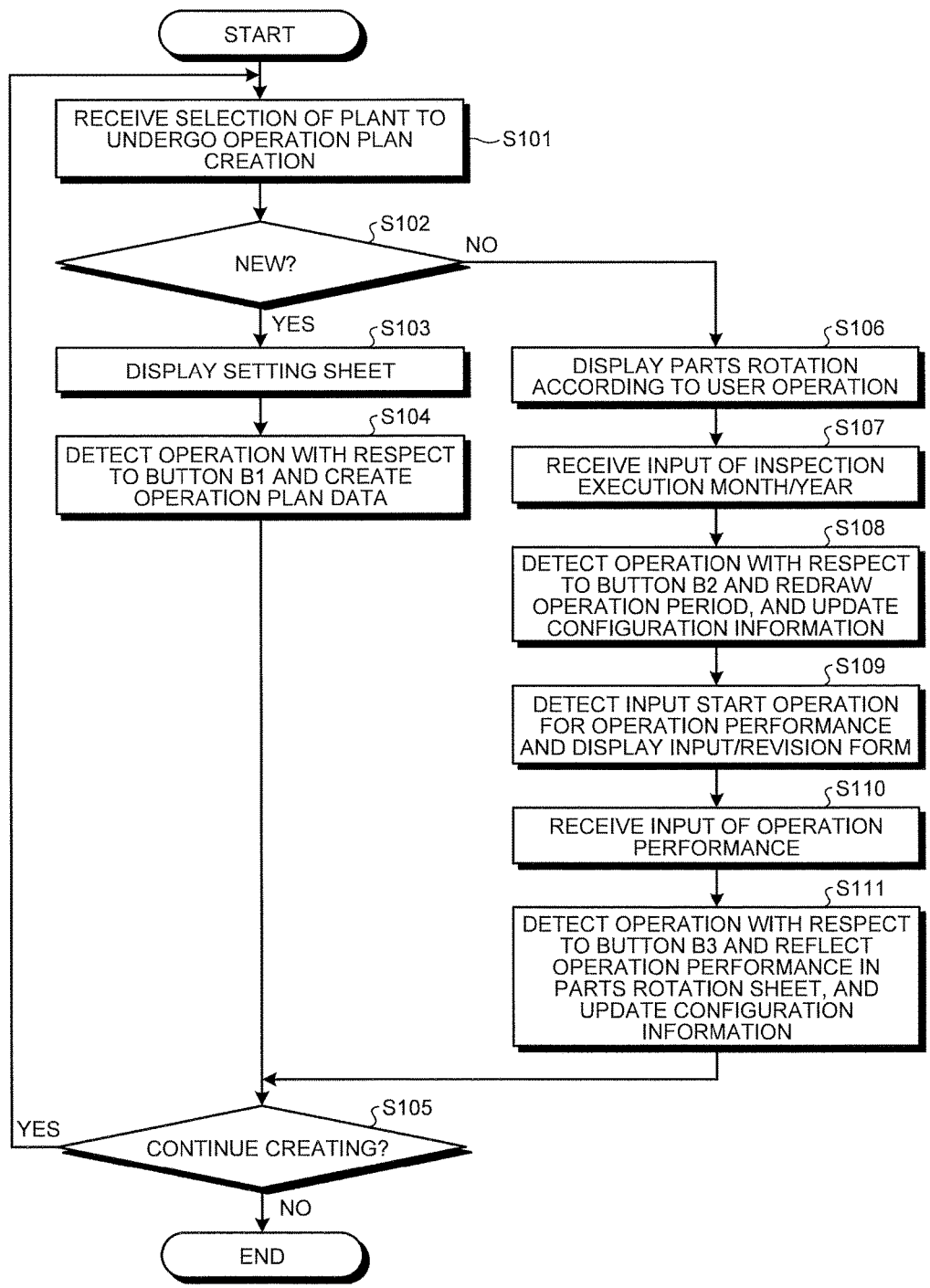
FIG. 10 is a flowchart illustrating the flow of processing executed by the operation plan creation device according to the present embodiment.

Processing executed by the operation plan creation device according to the present embodiment will be described using FIG. 10. FIG. 10 is a flowchart showing the flow of processing executed by the operation plan creation device according to the present embodiment. The processing illustrated in FIG. 10 is executed by the control unit 150 reading the operation plan creation program 161 stored in the storage unit 160.

As illustrated in FIG. 10, for example, when the selection of a plant to undergo the creation of an operation plan is received from the user on a prescribed interface displayed on the display unit 110 (step S101), the control unit 150 determines whether the operation plan to be created for the selected plant will be a new plan (step S102). Specifically, the control unit 150 determines whether there is an operation plan corresponding to the plant selected by the user among the operation plan data 163 stored in the storage unit 160.

As a result of the determination, if the operation plan to be created for the selected plant will be a new plan (step S102, Yes), the control unit 150 displays a setting sheet (see S1 in FIG. 2, for example) on the display unit 110 (step S103). Next, after the setting of the initial setting data 162 has been completed with respect to the setting sheet, the control unit 150 detects an operation with respect to the button B1 provided on the operation plan creation start sheet (see S2 in FIG. 3, for example), and automatically creates an operation plan (step S104). The operation plan automatically created in step S104 is data regarding an operation plan for high-temperature components for when the operation is started, and is stored in the storage unit 160 after being created.

After the operation plan has been created, the control unit 150 determines whether creation is to be continued (step S105). For example, the control unit 150 displays, on the display unit 110, a screen for confirming whether the creation of an operation plan is to be continued, and determines whether an operation to execute the continuation of creation has been received from the user.

As a result of the determination, if creation is to be continued (step S105, Yes), the control unit 150 returns to the aforementioned step S101. In contrast to this, as a result of the determination, if creation is not to be continued (step S105, No), the control unit 150 ends the processing illustrated in FIG. 10.

In the aforementioned step S102, as result of the determination, if the operation plan to be created for the selected plant will not be a new plan (step S102, No), the control unit 150 determines that a created operation plan is to be updated, and displays on the display unit 110 a parts rotation sheet (see S3 in FIGS. 3 and 4, for example) for the target plant in accordance with an operation of the user (step S106).

Next, after the input of the year/month in which a periodic inspection is carried out has been received in the parts rotation sheet S3 displayed on the display unit 110 (step S107), the control unit 150 detects an operation with respect to the button B2, redraws the operation period, and updates the configuration information of the high-temperature components (step S108). For example, as illustrated in FIG. 8, when the input of data "10" corresponding to October, which is the month in which a periodic inspection is carried out, and data "C" corresponding to an inspection pattern, for example, is received in the region of operation year "2011" for device No. 1 in the parts rotation sheet S3 displayed on the display unit 110, the control unit 150 determines that a periodic inspection was carried out in October of 2011. Then, as illustrated in the aforementioned FIG. 8, when an operation with respect to the button B2 provided on the parts rotation sheet S3 is detected, the control unit 150, on the basis of the data "10" corresponding to the month in which the periodic inspection was carried out, recalculates the operation period, redraws the image corresponding to the recalculated operation period on the parts rotation sheet S3, and updates the configuration information (such as consumption EOH) of the high-temperature components removed for a periodic inspection.

Next, the control unit 150 detects an input start operation for operation performance, and displays the input/revision form sheet S5 (see FIG. 9, for example) on the display unit 110 (step S109). For example, the control unit 150 detects an operation with respect to an end section of an operation period of the high-temperature components drawn on the parts rotation sheet S3, as an input start operation for operation performance.

Next, after the input for operation performance has been received on the input/revision form sheet S5 (step S110), the control unit 150 detects an operation with respect to the button B3 provided on the input/revision form, and updates the configuration information (such as consumption EOH) of the high-temperature components with the operation performance being reflected in the parts rotation sheet S3 (step S111). The control unit 150 then moves to the aforementioned step S105.

As described above, in the present embodiment, the operation plan creation device 100 automatically updates the operation period and configuration information of the high-temperature components in the initial operation plan, on the parts rotation sheet, on the basis of the month in which a periodic inspection is carried out. In addition, the operation plan creation device 100 causes the user to input the actual operation performance of devices (device No. 1 to device No. 4, for example) in the input/revision form, and updates the operation period and configuration information on the parts rotation sheet with the input operation performance being reflected. As a result of this, according to the present embodiment, it is possible for information regarding an operation plan for high-temperature components to be easily updated in accordance with usage performance.

Furthermore, in the present embodiment, the operation plan creation device 100 displays, on a quantity sheet (see S4 in FIG. 7) displayed on the display unit 110, data obtained by aggregating totals of each component mounted in the devices (001, for example), data obtained by aggregating totals of each component corresponding to a treatment classification for each device (002, for example), remarks data (003, for example), and the like. As a result of this, according to the present embodiment, it is possible for the user to easily grasp information of each component mounted in the devices.

Other Embodiments

Figure 11:
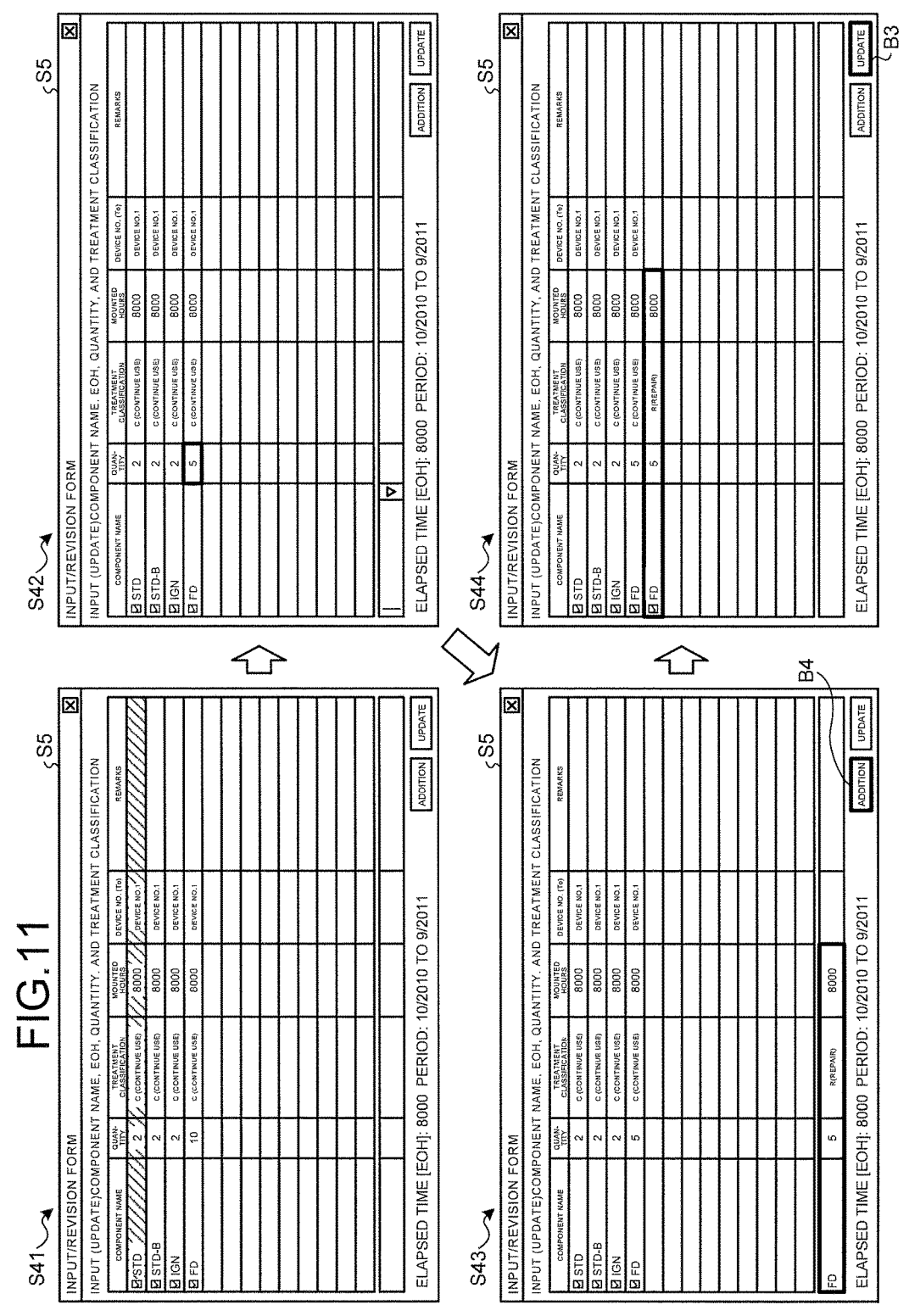
Figure 12:
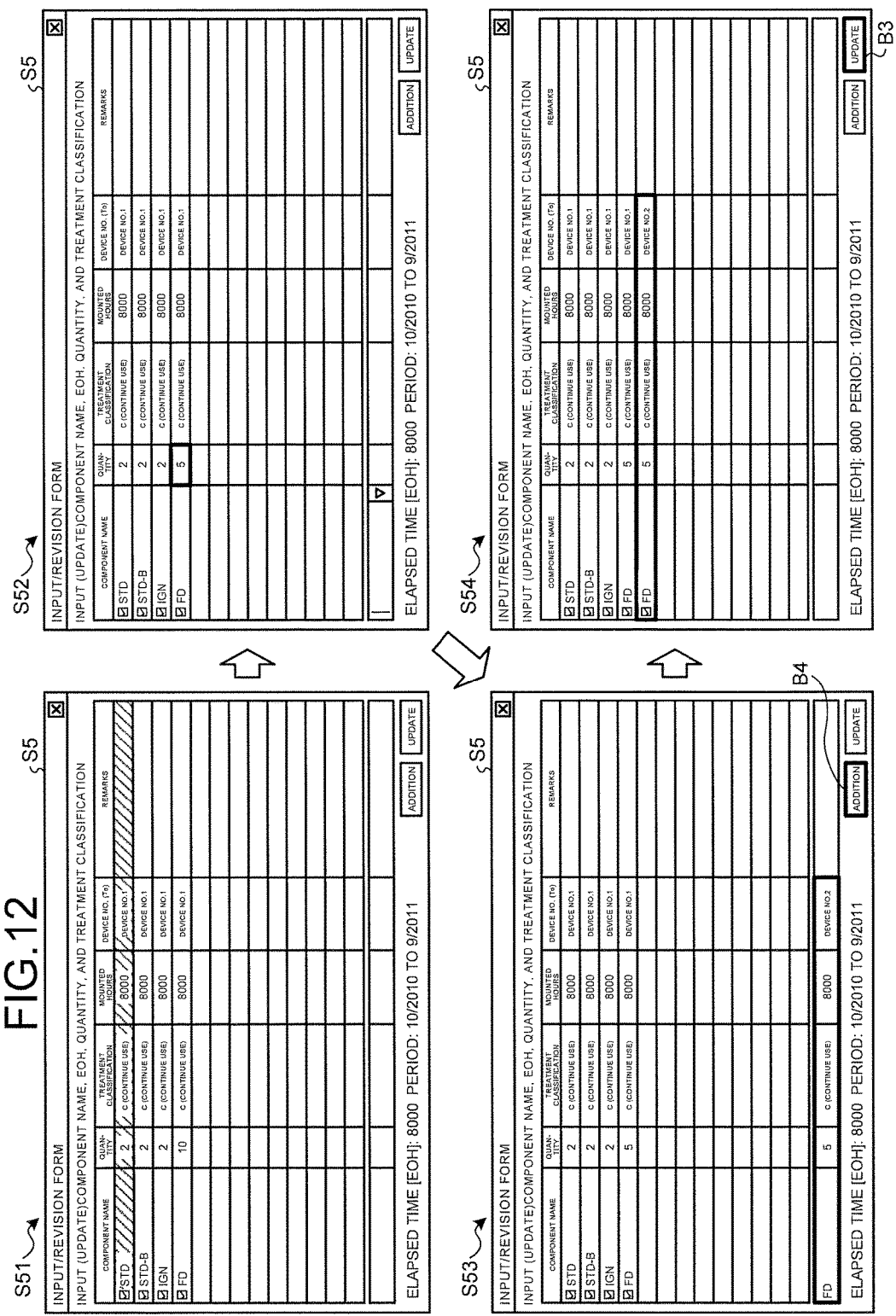
FIG. 12 is a drawing illustrating an example of the input of settings for treatment for high-temperature components removed for a periodic inspection.
Figure 13:
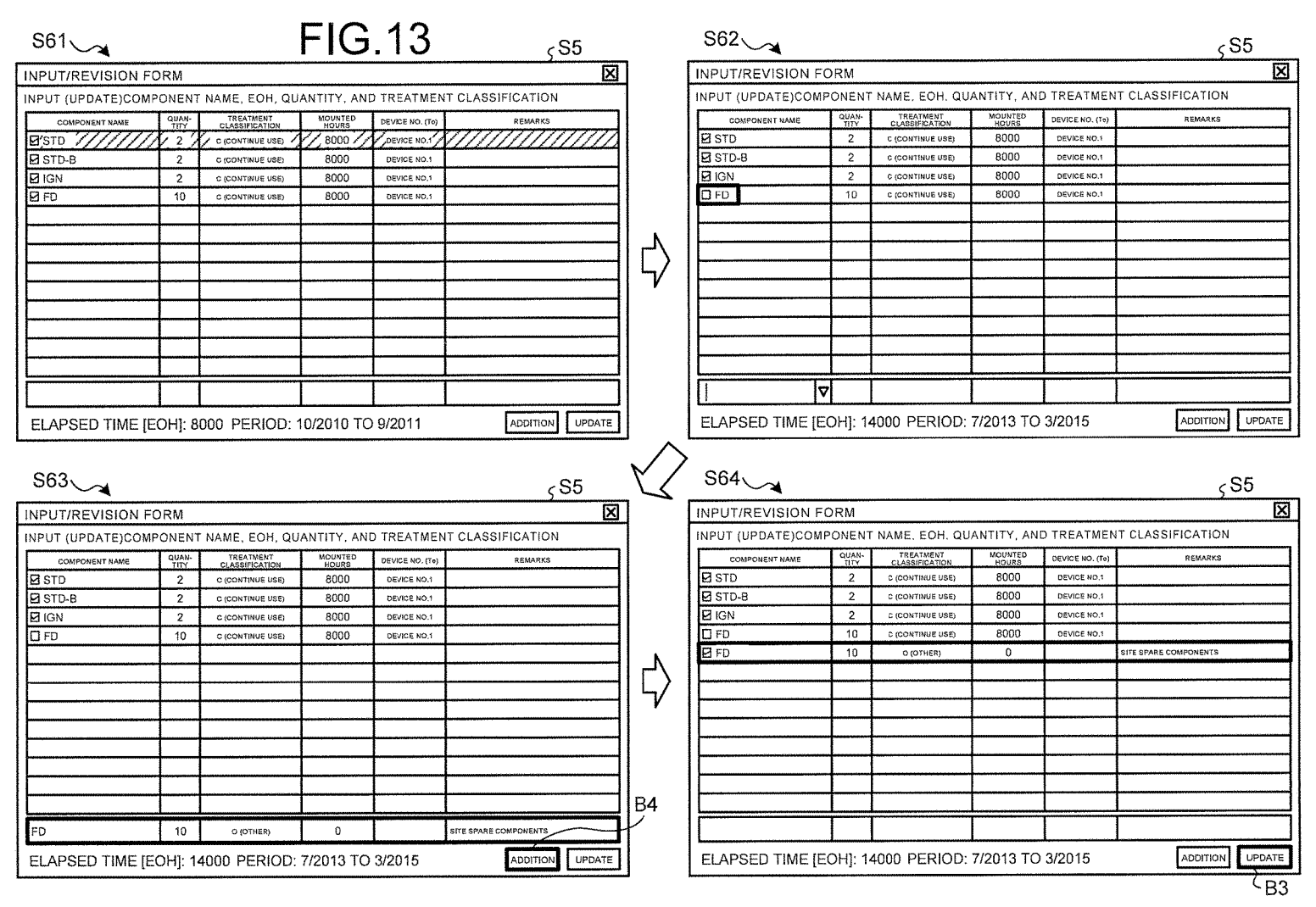

Other embodiments will be described using FIGS. 11 to 13. FIGS. 11 to 13 are drawings illustrating an example of the input of settings for treatment for high-temperature components removed for a periodic inspection.

FIG. 11 illustrates a setting example for the case in which some high-temperature components removed for a periodic inspection are continued to be used and some are sent for repair. As illustrated in FIG. 11, the control unit 150 displays the input/revision form sheet S5 (step S41), and receives a change (10→5) in the quantity of high-temperature components "FD" for which the treatment classification is "C (continue use)", on the input/revision form sheet S5 (step S42).

Next, on the input/revision form sheet S5, the control unit 150 receives the input of information (component name "FD", quantity "5", treatment classification "R (repair)", mounted hours "8000") for sending some of the high-temperature components "FD" for repair (step S43). Then, when an operation with respect to a button B4 provided in the input/revision form sheet S5 is detected, the control unit 150 adds, to the sheet S5, a record of the information (component name "FD", quantity "5", treatment classification "R (repair)", mounted hours "8000") for sending some of the high-temperature components "FD" for repair (step S44). Then, when an operation with respect to the button B3 provided in the input/revision form sheet S5 is detected, the control unit 150 performs an update with the information for sending some of the high-temperature components "FD" for repair being reflected in the parts rotation sheet (S3 in FIG. 9, for example).

According to the example illustrated in FIG. 11, the operation plan creation device 100 performs an automatic update with the information for sending some of the high-temperature components removed for a periodic inspection for repair being reflected in the parts rotation sheet (S3 in FIG. 9, for example) by using the input/revision form sheet S5, and it is therefore possible for the user to easily have reflected in the operation plan that some of the high-temperature components removed for a periodic inspection are to be sent for repair.

FIG. 12 illustrates a setting example for the case in which some high-temperature components removed for a periodic inspection are continued to be used in the same device and some are moved to another device and are continued to be used. As illustrated in FIG. 12, the control unit 150 displays the input/revision form sheet S5 (step S51), and receives changes (10→5) in the quantity of high-temperature components "FD" for which the treatment classification is "C (continue use)", on the input/revision form sheet S5 (step S52).

Next, on the input/revision form sheet S5, the control unit 150 receives the input of information (component name "FD", quantity "5", treatment classification "C (continue use)", mounted hours "8000", device number "device No. 2") for moving some of the high-temperature components "FD" to device No. 2 for continued use (step S53). Then, when an operation with respect to the button B4 provided on the input/revision form sheet S5 is detected, the control unit 150 adds, to the sheet S5, a record of the information (component name "FD", quantity "5", treatment classification "C (continue use)", mounted hours "8000", device number "device No. 2") for moving some of the high-temperature components "FD" to device No. 2 for continued use (step S54). Then, when an operation with respect to the button B3 provided on the input/revision form sheet S5 is detected, the control unit 150 performs an update with the information for moving some of the high-temperature components "FD" to device No. 2 for continued use being reflected in the parts rotation sheet (S3 in FIG. 9, for example).

According to the example illustrated in FIG. 12, the operation plan creation device 100 performs an automatic update with the information for moving some of the high-temperature components removed for a periodic inspection to device No. 2 for continued use being reflected in the parts rotation sheet (S3 in FIG. 9, for example) by using the input/revision form sheet S5, and it is therefore possible for the user to easily have reflected in the operation plan that some of the high-temperature components removed for a periodic inspection are to be moved to another device for continued use.

FIG. 13 illustrates a setting example for the case in which some high-temperature components removed for a periodic inspection are replaced with spare components. As illustrated in FIG. 13, the control unit 150 displays the input/revision form sheet S5 (step S61), and receives a selection cancellation (the check mark in a checkbox is removed) for high-temperature components "FD" for which the treatment classification is "C (continue use)", on the input/revision form sheet S5 (step S62).

Next, on the input/revision form sheet S5, the control unit 150 receives the input of information (component name "FD", quantity "10", treatment classification "O (other)", mounted hours "0", remarks "site spare component") for replacing some of the high-temperature components "FD" with spare components (step S63). Then, when an operation with respect to the button B4 provided on the input/revision form sheet S5 is detected, the control unit 150 adds, to the sheet S5, a record of the information (component name "FD", quantity "10", treatment classification "O (other)", mounted hours "0", remarks "site spare component") for replacing some of the high-temperature components "FD" with spare components (step S64). Then, when an operation with respect to the button B3 provided on the input/revision form sheet S5 is detected, the control unit 150 performs an update with the information for replacing some of the high-temperature components "FD" with spare components being reflected in the parts rotation sheet (S3 in FIG. 9, for example).

According to the example illustrated in FIG. 13, the operation plan creation device 100 performs an automatic update with the information for replacing some of the high-temperature components removed for a periodic inspection with spare components being reflected in the parts rotation sheet (S3 in FIG. 9, for example) by using the input/revision form sheet S5, and it is therefore possible for the user to easily have reflected in the operation plan that some of the high-temperature components removed for a periodic inspection are to be replaced with spare components.

The processing of the aforementioned embodiments is able to be applied to a variety of components operated on the basis of a predetermined operation plan.

Note that the aspects of the present invention described in the aforementioned embodiments are able to be altered in a desired manner which does not deviate from the gist of the present invention. For example, the program described in the aforementioned embodiments may be divided into a plurality of modules, and may be integrated with another program. Furthermore, the functions of the operation plan creation device 100 may be appropriately distributed among a plurality of devices.

REFERENCE SIGNS LIST

100 Operation plan creation device
110 Display unit
120 Input unit
130 Communication unit
140 Media reading unit
150 Control unit
160 Storage unit
161 Operation plan creation program
162 Initial setting data
163 Operation plan data
164 Operation performance data

The invention claimed is:

1. An operation plan creation device for creating an operation plan concerning a rotation operation in which a plurality of units configured of multiple high-temperature components are alternately mounted in devices unit-by-unit, the operation plan creation device comprising:
a display configured to associate, for each of the devices, data corresponding to an image corresponding to an operation period of the high-temperatures components, configuration information of the high-temperature components, and configuration information of the high-temperature components removed for a periodic inspection with each other in a display screen, and display the data as the operation plan;
a storage configured to store, for each of the devices, at least initial setting data which includes the configuration information of the high-temperature components mounted in the devices, information regarding operation start times of the high-temperature components and scheduled times for carrying out periodic inspections of the high-temperature components; and
a processor configured to execute computer executable components stored in the storage, wherein the computer executable components include:
an operation plan creation unit configured to, using the initial setting data, automatically generate data of the operation plan including the operation period of the high-temperature components from the operation start times to the scheduled times for carrying out the periodic inspections and the configuration information of the high-temperature components, and display the generated operation plan on the display; and
an operation plan update unit configured to, in response to acquiring information for specifying execution times at which the periodic inspections are carried out and actual operation performance data, as information regarding operation performance of the high-temperature components, automatically update data of the operation plan and redraw the image corresponding to the operation period in the operation plan displayed on the display, on the basis of the acquired information and the actual operation performance data,
wherein the operation plan update unit is configured to, in response to acquiring each of information items for specifying a quantity of the high-temperature components to undergo the periodic inspections, for specifying treatment contents for the high-temperature components to undergo the periodic inspections, for specifying an operation time for the high-temperature components to undergo the periodic inspections, for specifying removal or replacement of the high-temperature components, and for specifying a rotation destination for the high-temperature components to undergo the periodic inspections as the information regarding the operation performance of the high-temperature components, automatically update the data of the operation plan on the basis of each of the acquired information items and reflect the updated data to the configuration information in the operation plan displayed on the display, and
wherein the updated data of the operation plan displayed on the display includes the actual operation performance data,
the configuration information of the high-temperature components includes consumption EOH (equivalent operating hours) corresponding to the equivalent operating hours consumed and corresponding to the operation period,
the display is configured to display the consumption EOH in the vicinity of the image corresponding to the operation period in the operation plan in association with the image corresponding to the operation period in the operation plan, and the operation plan update unit is configured to update and display the consumption EOH when redrawing the image corresponding to the operation period in the operation plan.

2. The operation plan creation device according to claim 1, wherein the operation plan update unit is configured to aggregate for each of the treatment contents the information for specifying the quantity acquired as the information regarding the operation performance of the high-temperature components, and store the aggregated information for each of the devices in the storage.

3. An operation plan creation method executed by an operation plan creation device for creating an operation plan concerning a rotation operation in which a plurality of units configured of multiple high-temperature components are alternately mounted in devices unit-by-unit, the method comprising:

reading initial setting data from a storage which stores, for each device in which multiple high-temperature components are mounted, at least the initial setting data which includes configuration information of the high-temperature components mounted in the device, information regarding operation start times of the high-temperature components and scheduled times for carrying out periodic inspections of the high-temperature components, and using the read initial setting data to automatically generate data of the operation plan including operation periods of the high-temperature components from the operation start times to the scheduled times for carrying out the periodic inspections, and the configuration information of the high-temperature components;

associating for each of the devices, data corresponding to an image corresponding to the operation period, the configuration information, and configuration information of the high-temperature components removed for a periodic inspection with each other in a display screen, and displaying the data as the operation plan on a display;

in response to acquiring information for specifying execution times at which the periodic inspections are carried out and actual operation performance data, as information regarding operation performance of the high-temperature components, automatically updating data of the operation plan and redrawing the image corresponding to the operation period in the operation plan displayed on the display, on the basis of the acquired information and the actual operation performance data; and in response to acquiring each of information items for specifying a quantity of the high-temperature components to undergo the periodic inspections, for specifying treatment contents for the high-temperature components to undergo the periodic inspections, for specifying an operation time for the high-temperature components to undergo the periodic inspections, for specifying removal or replacement of the high-temperature components, and for specifying a rotation destination for the high-temperature components to undergo the periodic inspections as the information regarding the operation performance of the high-temperature components, automatically updating the data of the operation plan on the basis of each of the acquired information items and reflecting the updated data to the configuration information in the operation plan displayed on the display, wherein the updated data of the operation plan displayed on the display includes the actual operation performance data, the configuration information of the high-temperature components includes consumption EOH (equivalent operating hours) corresponding to the equivalent operating hours consumed and corresponding to the operation period, the consumption EOH is displayed on the display in the vicinity of the image corresponding to the operation period in the operation plan in association with the image corresponding to the operation period in the operation plan, and the consumption EOH is updated and displayed when redrawing the image corresponding to the operation period in the operation plan.

4. A non-transitory computer-readable storage medium that stores an operation plan creation program that causes an operation plan creation device, which creates an operation plan concerning a rotation operation in which a plurality of units configured of multiple high-temperature components are alternately mounted in devices unit by unit, to execute steps comprising:

reading initial setting data from a storage which stores, for each device in which multiple high-temperature components are mounted, at least the initial setting data which includes configuration information of the high-temperature components mounted in the device, information regarding operation start times of the high-temperature components and scheduled times for carrying out periodic inspections of the high-temperature components, and using the read initial setting data to automatically generate data of the operation plan including operation periods of the high-temperature components from the operation start times to the scheduled times for carrying out the periodic inspections and the configuration information of the high-temperature components;

associating, for each of the devices, data corresponding to an image corresponding to the operation period, the configuration information, and configuration information of the high-temperature components removed for a periodic inspection with each other in a display screen, and displaying the data as the operation plan on a display;

in response to acquiring information for specifying execution times at which the periodic inspections are carried out and actual operation performance data, as information regarding operation performance of the high-temperature components, automatically updating data of the operation plan and redrawing the image corresponding to the operation period in the operation plan displayed on the display, on the basis of the acquired information and the actual operation performance data; and in response to acquiring each of information items for specifying a quantity of the high-temperature components to undergo the periodic inspections, for specifying treatment contents for the high-temperature components to undergo the periodic inspections, for specifying an operation time for the high-temperature components to undergo the periodic inspections, for specifying removal or replacement of the high-temperature components, and for specifying a rotation destination for the high-temperature components to undergo the periodic inspections as the information regarding the operation performance of the high-temperature components, automatically updating the data of the operation plan on the basis of each of the acquired information items and reflecting the updated data to the configuration information in the operation plan displayed on the display, wherein the updated data of the operation plan displayed on the display includes the actual operation performance data, the configuration information of the high-temperature components includes consumption EOH (equivalent operating hours) corresponding to the equivalent operating hours consumed and corresponding to the operation period, the consumption EOH is displayed on the display in the vicinity of the image corresponding to the operation period in the operation plan in association with the image corresponding to the operation period in the operation plan, and the consumption EOH is updated and displayed when redrawing the image corresponding to the operation period in the operation plan.

* * * * *